United States Patent [19]

Allcock et al.

[11] 4,288,585

[45] Sep. 8, 1981

[54] CARBORANYLCYCLOTRIPHOSPHAZENES AND THEIR POLYMERS

[76] Inventors: Robert A. Frosch, Administrator of the National Aeronautics and Space Administration, with respect to an invention of; Harry R. Allcock, State College, Pa.; John P. O'Brien, Wilmington, Del.; Angelo G. Scopelianos, University Park, Pa.; Larry L. Fewell, San Jose, Calif.

[21] Appl. No.: 129,799

[22] Filed: Mar. 12, 1980

[51] Int. Cl.³ ............... C08G 73/00; C08G 79/02
[52] U.S. Cl. ............................. 528/4; 528/168; 528/6; 528/7; 568/2; 568/4; 568/5; 528/399
[58] Field of Search .............. 528/4, 6, 7, 394, 399; 568/2, 4, 5

[56] References Cited

U.S. PATENT DOCUMENTS

| | | | |
|---|---|---|---|
| 3,155,630 | 11/1964 | Schroeder | 528/6 |
| 3,164,556 | 1/1965 | Apley et al. | 528/394 |
| 3,320,185 | 5/1967 | Alexander et al. | 528/6 |
| 3,549,604 | 12/1970 | Semenuk et al. | 528/4 |

*Primary Examiner*—Wilbert J. Briggs, Sr.
*Attorney, Agent, or Firm*—Darrell G. Brekke; John R. Manning

[57] ABSTRACT

Carboranyl-substituted polyphosphazenes are prepared by heat polymerizing a carboranyl halocyclophosphazene at 250° C. for about 120 hours in the absence of oxygen and moisture. The cyclophosphazene is obtained by allowing a lithium carborane, e.g. the reaction product of methyl-o-carborane with n-butyllithium in ethyl ether, to react with e.g. hexachlorocyclotriphosphazene at ambient temperatures and in anhydrous conditions. For greater stability in the presence of moisture, the chlorine substituents of the polymer are then replaced by aryloxy or alkoxy groups, such as $CF_3CH_2O-$.

The new substantially inorganic polymers are thermally stable materials which produce a high char yield when exposed to extreme temperatures, and can thus serve to insulate less heat and fire resistant substances.

4 Claims, No Drawings

CARBORANYLCYCLOTRIPHOSPHAZENES AND THEIR POLYMERS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

This invention relates to carboranylcyclophosphazene monomers and to heat resistant high char yield polymers made from such monomers.

BACKGROUND ART

Various polymerizable compounds can be prepared by reaction of lithium carborane with a bromocompound containing ethylenic unsaturation (U.S. Pat. No. 3,669,993, column 2, lines 1 to 15), or by a Grignard type reaction involving a bromoalkylcarborane and an alkenylbromide (U.S. Pat. No. 3,431,234). In the latter case, the resulting carborane is further converted to a carboranylsilane which can be polymerized to a heat resistant polysiloxane resin.

Another type of polymer known to the art is made by polymerizing cyclic dihalophosphazenes and, for water resistance, substituting alkoxy or aryloxy groups for the halogens in the molecule (e.g., U.S. Pat. Nos. 3,370,020; 3,880,800; and 3,883,451). One of these cyclic dihalophosphazene compounds, $N_3P_3F_6$, has given good yields of mixed fluorophenyl phosphazenes, $N_3P_3F_{6-n}\phi_n$, when allowed to react with phenyl lithium, $\phi Li$. In general, however, organolithium reagents have showed, upon reaction with cyclic phosphazenes, a tendency to yield ring-opened compounds instead of the expected alkylated or arylated derivatives.

The principal object of this invention is to synthesize new carborane-substituted cyclophosphazenes and to polymerize these compounds to heat-resistant polymers that are mainly inorganic in character.

DISCLOSURE OF INVENTION

The objects of this invention have been achieved by allowing a lithium carborane to react with a halocyclophosphazene at about 25° C. in diethyl ether to form a carboranyl-substituted halocyclophosphazene. The latter compound is then heat polymerized to yield a carboranyl-substituted polyphosphazene. In both the monomer and the polymer so prepared, the halogen atoms may be replaced by one or more alkoxy or aryloxy groups for greater stability in the presence of moisture.

DETAILED DESCRIPTION OF THE INVENTION

The chemical reactions and the compounds involved in the present invention can be more easily visualized by reference to the following scheme:

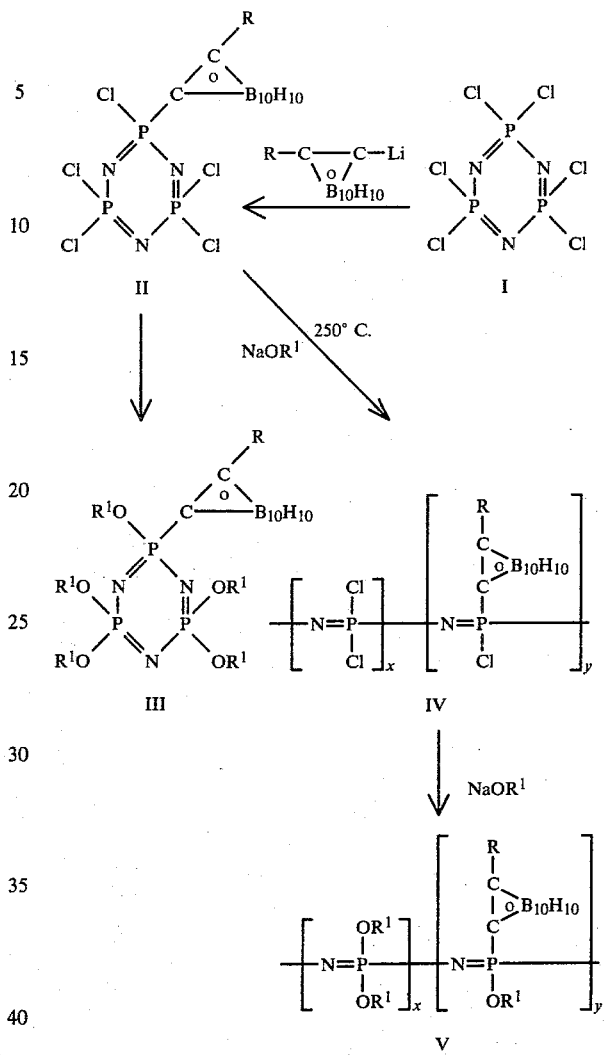

In the above formulas, R represents a hydrogen atom, a lower alkyl radical having up to 6 carbon atoms, or an aryl radical of up to 9 carbon atoms. The methyl and phenyl groups, however, are preferred. $R^1$, on the other hand, stands for an alkyl group, an aryl group, a halogenated homolog of said groups, or a mixture of any of these groups. The preferred groups are those of the formula $F(CF_2)_aCH_2-$ or $H(CF_2)_b(CH_2)-$ in which a and b are small integers not greater than 9. In polymeric formulas IV and V, the ratio of x to y is 2:1, the number and type of polymeric units that it quantifies being determined by the carboranylcyclotriphosphazene structure II.

The lithium carborane employed in the above scheme is prepared from the alkyl or arylcarborane by reaction with n-butyllithium in the conventional manner. One of these alkylcarboranes, methylcarborane, was prepared from the bromomethyl homolog by reaction with magnesium metal and subsequent hydrolysis of the metal organic bromide obtained.

Attempts to convert o-carborane to methylcarborane via the organolithium route were unsuccessful.

The reaction between the carborane and the organolithium, preferable n-butyllithium, was carried out at ambient temperature in a solvent such as diethylether. The resulting solution was combined with a similar solution of a halocyclotriphosphazene to yield, after about 12 hours at ambient temperature, the desired carboranylhalocyclotriphosphazene. The preferred cyclic phosphazene for this purpose is the pentachlorocyclotriphosphazene, although other homologs with fluorine or bromine can also be employed.

The carboranylpentahalotriphosphazene monomer may then be polymerized simply by heating at 250° C. in the absence of air and moisture during about 120 hours. These conditions will of course vary depending on the exact nature of the monomeric compound used and the desirability of optimizing the process.

The carboranyl substituted polychlorophosphazenes that can be produced by the method just described, as well as the monomeric entities, can be converted to the penta-alkoxy or aryloxy homologs by reaction with a suitable sodium alcoholate or phenolate, $NaOR^1$. The reaction as well as the reactants that can be employed to carry it out, are fully described in the art, e.g. in U.S. Pat. Nos. 3,888,800 and 3,888,451. Unexpectedly, the relatively large carborane cage structure exerts only a minimal steric shielding effect on the geminal phosphorus-chlorine bond both in the trimer and in the polymer.

The carboranyl-substituted polychloro- and polyalkoxyphosphazenes of this invention have a molecular weight within the range of about $1\times10^5$ to $1\times10^6$. They are thermally stable materials which, upon decomposition at extreme temperatures, produce a high char yield which serves to insulate other less resistant materials from the effects of heat and flame.

The process of the invention will now be illustrated in operational detail by the following examples which are not intended to limit the scope of said invention as stated in the appended claims.

EXAMPLE 1

Phenyl-o-carborane, 4.95 g ($2.25\times10^{-2}$ mol), and n-butyllithium, ($2.25\times10^{-2}$ mol), were dissolved in diethyl ether, 10 ml, at 25° C. To this solution, there was then added a solution of hexachlorocyclotriphosphazene (I), 7.85 g ($2.25\times10^{-2}$ mol) in diethyl ether, 20 ml. The reaction was allowed to proceed for 12 hours at 25° C. in anhydrous conditions. The solvent was removed under reduced pressure and the residue was heated at 80° C. and 0.05 mm Hg to remove unreacted starting material. A subsequent increase in temperature to 120° C. brought about the volatilization and condensation of II. Recrystallization of this compound from heptane yielded a substance melting at 133° C., which was identified as phenylcarboranyl-pentachlorocyclotriphosphazene (II) by elemental microanalysis, infrared, mass spectrometric, and NMR techniques. A single-crystal X-ray structure determination confirmed the structure. All features of the molecule were identified, including the hydrogen atoms attached to the boron atoms.

EXAMPLE 2

The preparation of Example 1 was repeated with methyl-o-carborane instead of phenyl-o-carborane, and yielded methylcarboranylpentachlorotriphosphazene (II), a compound with a melting point of 93° C. Again, the structure was deduced by elemental microanalysis, infrared, mass spectrometric, and NMR techniques.

EXAMPLE 3

Phenylcarboranylpentachlorotriphosphazene (II), 1.00 g ($1.87\times10^{-3}$ mol), was dissolved in dry THF (15 ml), and treated with a solution of sodium trifluoroethoxide, 3.42 g ($2.80\times10^{-2}$ mol), in THF (20 ml) for 28 hours at 66° C. The mixture was then neutralized to litmus with concentrated hydrochloric acid and the product was isolated by extraction with benzene and dried over $MgSO_4$. Upon filtration and removal of the solvent, the oily product III was obtained. Analysis of the oily material thus obtained by I.R., NMR and mass spectrometric techniques showed that all five chlorine atoms on the triphosphazene had been replaced by trifluoroethoxy groups ($CF_3CH_2O$—) to yield phenylcarboranylpentatrifluoroethoxycyclotriphosphazene (III).

EXAMPLE 4

The phenylcarboranylcyclopentachlorotriphosphazene monomer (II) of Example 1 was polymerized by heating in an evacuated pyrex tube at 250° C. for 120 hours. The polymeric product (IV), 1.00 g ($1.87\times10^{-3}$ mol), was subjected to chlorine replacement by reaction with sodium trifluoroethoxide, 1.71 g ($1.40\times10^{-2}$ mol), in boiling tetrahydrofuran, 40 ml, for a period of 120 hours, to yield the fluoroethoxy-substituted polymer (V). The product was concentrated and neutralized to litmus with HCl. The precipitate was filtered off, washed with water and dried. The high polymers were obtained by fractional precipitation of a THF solution of the products into hexane and benzene to give V. Infrared, microanalytical, and NMR data obtained were compatible with the structure shown for V. Gel permeation chromatography gave a molecular weight of $1\times10^5$.

Thermographic analysis with a duPont Model 990 thermoanalyzer was carried out on a sample of the polymer at a heating rate of 2° C. per minute to a temperature of 1000° C. in nitrogen. Some loss of weight was observed, principally between 250° and 550° C., but a char yield of 56.5% of the original sample weight remained at 1000° C. A parallel test of the material in air showed a substantially similar decomposition curve and produced a char yield of 53.0%. The polymer therefore appears to be resistant to oxidation at high temperatures. For comparison purposes, a conventional poly(-bis-trifluoroethoxy)phosphazene, i.e. the basic polymer without carboranyl substituents, underwent rapid weight loss commencing at about 280° C. and was completely volatilized at 400° C. when tested under the same conditions in nitrogen.

EXAMPLE 5

On repeating the polymerization procedure described in Example 4 with the methylcarboranylcyclopentachlorotriphosphazene of Example 2, there was obtained a polymer with a molecular weight of $1\times10^6$, as determined by the gel permeation chromatographic technique.

We claim:

1. A carboranylphosphazene polymer having the formula

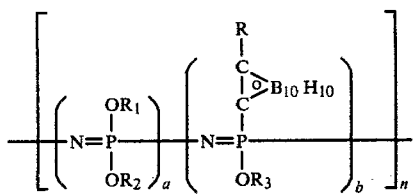

wherein the ratio of a to b is about 2:1; n is an integer such that the molecular weight of the polymer is within the range of about $1 \times 10^5$ to $1 \times 10^6$; R is selected from the class consisting of hydrogen, alkyl radicals of up to about 6 carbon atoms, and aryl radicals of up to about 9 carbon atoms; $R_1$, $R_2$, and $R_3$ are selected from the class consisting of alkyl radicals containing up to about 6 carbon atoms, fluorinated alkyl radicals containing up to about 6 carbon atoms, aryl radicals containing up to about 9 carbon atoms, chlorinated aryl radicals containing up to about 9 carbon atoms, and mixtures thereof.

2. The polymer of claim 1 wherein $R_1$, $R_2$ and $R_3$ stand for the $CF_3CH_2-$ group and R is methyl or phenyl.

3. A process for the preparation of carboranylphosphazene polymers, which comprises:
 (a) allowing to react at about ambient temperature for a period of up to about 12 hours, about equimolar quantities of a halocyclotriphosphazene and a lithium carborane dissolved in an anhydrous inert organic solvent,
 (b) insolating the resulting carboranylpentahalocyclotriphosphazene, and
 (c) polymerizing said triphosphazene by heating at about 250° C. for about 120 hours in the absence of oxygen and moisture.

4. The process of claim 3 wherein the halocyclotriphosphazene is the hexachloro homolog.

* * * * *